United States Patent [19]
Finucane et al.

[11] 3,829,588
[45] Aug. 13, 1974

[54] DIPEPTIDE LOW-GRADE COFFEES

[75] Inventors: Thomas P. Finucane, Hartsdale; Joseph J. Halik, Ossining, both of N.Y.

[73] Assignee: General Foods Corporation, White Plains, N.Y.

[22] Filed: Oct. 19, 1972

[21] Appl. No.: 298,963

[52] U.S. Cl................. 426/354, 426/217, 426/364
[51] Int. Cl. ............................................. A23f 1/04
[58] Field of Search ... 99/65, 71, 78, 140 A, 140 R; 426/302, 309, 354, 366, 217, 212, 289, 364

[56] References Cited
UNITED STATES PATENTS
3,475,403  10/1969  Mazur et al.................. 99/141 A X
3,492,131   1/1970  Schlatter........................... 99/141 A
3,695,898  10/1972  Hill et al............................. 426/217

Primary Examiner—Frank W. Lutter
Assistant Examiner—Neil F. Greenblum
Attorney, Agent, or Firm—Daniel J. Donovan; Bruno P. Struzzi; Thomas R. Savoie

[57]  ABSTRACT

The bitterness of low-grade coffee products is repressed by the addition of a dipeptide sweetener at the appropriate level.

11 Claims, No Drawings

DIPEPTIDE LOW-GRADE COFFEES

BACKGROUND OF THE INVENTION

The present invention relates to a method of reducing the characteristic bitter taste of coffee products containing a major amount of low-grade coffees. Specifically, the invention pertains to the use of dipeptide sweeteners in blends of dry low-grade coffee extracts as well as addition of the dipeptide to the brew itself to effectively mask the bitter taste common to such beans having inferior flavor quality.

The dipeptides utilized in this invention are those compounds which have recently been found to exhibit intense sweetness, examples of these compounds and uses of the same being set forth principally in U.S. Pat. Nos. 3,475,403 issued Oct. 28, 1969 and 3,492,131 issued Jan. 27, 1970.

Most roasted and ground coffee products are produced from a blend of choice and lower grade coffees to provide a product which is not only gustatorially pleasing to the consumer but one which is economical from a production and marketing standpoint. However, due to the higher solubles content of low grade coffees such as the Robustas, major amounts of these types of coffee are used in the conventional instant or soluble coffee product. Robustas are traditionally the lowest priced coffee bean and consequently, the marketability of soluble coffee rests both in its convenient preparation and its price.

A major disadvantage however in using major amounts of low grade coffees such as Robustas (e.g., Camaroon, Madagascar, Ambrize), Indonesian Robustas, low-grade Arabicas such as Paranas and the like has been that many of these have strong distinctive bitter flavor characteristics. Consequently, their content in a product can beneficially affect the cost but adversely affect the flavor quality if present in sufficient amounts. Many coffee blends utilize these kinds of coffee to contribute desirable flavor notes but the extent of their use is necessarily restricted by their characteristic bitter quality even when they are processed under their optimum conditions. However, the instant coffee consumer especially, has heretofore had to forsake some quality and flavor for price since to make a low-priced coffee product economically feasible, it is necessary to increase the amount of lower-priced/lower-grade coffee incorporated therein.

SUMMARY OF THE INVENTION

It has been found that the addition of a dipeptide sweetener to a coffee product having a flavor-wise detectable amount of low-grade coffee contained therein represses the bitter taste characteristic of the same. More specifically, when the dipeptide, particularly L-aspartyl-L-phenylalanine methyl ester is added to either an instant coffee product derived from major amounts of Robusta or similar types of coffee bean, or when added to a roast and ground brew containing the same, said dipeptide being added at a level below the threshold level for sweetness, the strong, bitter, harsh taste outstanding is masked. Such a subtle effect was not achieved when a corresponding amount of sucrose was tested. Therefore, the sweetness ascribed to the dipeptide in relation to its ability to reduce coffee bitterness is a feature regarded as unique to this compound, the combination of said sweetener with coffee derived from bitter blends rendering a novel less bitter coffee product, without perceptible added sweetness.

Accordingly, on a larger scale, the unique ability of the dipeptide sweetener to conceal undesirable flavor notes especially that of bitternesss as opposed to the inability of natural sweeteners such as sucrose to do the same, all having been tested at corresponding concentrations below the threshold levels for sweetness, finds extensive utility in bitter materials such as food, beverage, pharmaceutical systems and the like where the removal or repression of an objectionable flavor note(s) in the absence of sweetness is desired.

It is the principal object of this invention to provide a better quality coffee product for a lower cost.

The principal object of this invention is accomplished by adding a dipeptide to a coffee product derived partly or principally from low-grade coffee beans. Specifically, L-aspartyl-L-phenylalanine methyl ester is added to a coffee product conventionally containing major amounts of inexpensive coffee or to a coffee product adjusted to contain such major amounts of the same, in a concentration effective to reduce the objectionable flavor notes characteristic of the low-grade coffee, said level being below the threshold level for sweetness.

DESCRIPTION OF THE INVENTION

The present invention contemplates the introduction of a dipeptide sweetener into coffee products for the reduction of objectionable flavor qualities, principal among them being those products which traditionally contain major amounts of Robusta, Paranas coffees and the like or which have been adjusted to contain the same in a sufficiently major amount to render an objectionable flavor quality to the product.

The threshold level of the dipeptide for reduction of bitterness specifically L-aspartyl-L-phenylalanine methyl ester, on the basis of its presence in coffee brew is about 0.0025 percent. Lower than threshold levels were tested and those levels below threshold were found to repress the bitter flavor to a meager degree which was detected by a very small percentage of individuals participating in the organoleptic evaluations. Obviously, levels above threshold and below sweetness threshold, i.e., below about 0.016 percent dipeptide concentration are effective in reducing the characteristic flavor notes of the low-grade beans. Therefore, the scope of this invention is intended to include threshold and those levels above threshold level for reduction of bitter notes which are effective in reducing characteristically undesirable flavor qualities of Robustas and the like and which do not at the same time impart sweetness, i.e., concentrations comprehending the range of about 0.0025 to about 0.016 percent. However, it is to be understood that the threshold level itself of about 0.0025 percent, is the preferred embodiment of this invention for it functions to repress the undesirable flavor qualities of the low-grade coffee at this lower level for most individuals, higher than threshold levels finding application where used by those more sensitive to bitter, off flavors than the majority.

Essentially, the incorporation of the dipeptide itself may be applied both to roast and ground products as well as soluble coffee. The dipeptide sweeteners themselves are relatively unstable at high temperatures for extended periods of time and therefore, are preferably introduced at specific stages of the roast and ground or soluble coffee processes.

In the case of the roast and ground coffee product the dipeptide may be added preferably during four stages of the roasting and grinding process: during the quenching of the roasted beans at which time the dipeptide is suspended in the aqueous solution and sprayed directly onto the roasted bean either subsequent to quenching the beans to a temperature of below about 400°F, or after the beans have been cooled to room temperature, 400°F being the approximate temperature at which the dipeptide has been found to degrade initially; ground directly with the roasted beans as a dry additive; incorporated as a dry additive with the grounds; or sprayed while suspended in aqueous solution onto the grounds themselves.

In the case of soluble coffee, the dipeptide may be incorporated as a liquid or solid within the coffee extract just prior to the de-waxing of the extract; added to the de-waxed extract and co-dried with said extract; or sprayed as a solution of the dipeptide onto the dried extract itself. Where the dipeptide is sprayed onto the extract, the dipeptide may be sprayed as an aqueous solution or as is customarily the practice in soluble coffee technology where the dried extract is spray-plated with an aromatic oil (e.g., coffee oil), the dipeptide may be spray-plated as an emulsion with the aromatic oil itself. This latter method is preferable due to its elimination of an additional spraying procedure.

In each of the above-mentioned instances, the dipeptide is preferably added in an amount sufficient to effect at least about a 0.0025 percent concentration of the dipeptide in the resultant brew itself. In most instances this would usually require an initial concentration equivalent to the aforementioned threshold level. However, in the case where the dipeptide is added to the coffee extract prior to the de-waxing process for soluble coffee products for example, a small amount of the dipeptide may be carried off with the waxy residue. Consequently, a higher initial dipeptide concentration would be necessary.

Accordingly, the combination of dipeptides at lower than threshold level for sweetness, i.e., lower than that level where there is substantial sweetness, with coffee products containing major amounts of low-grade coffee renders a product which is not only economically attractive but also superior in flavor.

EXAMPLE I

The following percolate was used as the basic test medium:

| | |
|---|---|
| Coffee Robusta Medium to Light Roast | 53.9 gm |
| Water | 1183.0 gm |

The following two systems were prepared and simultaneously evaluated by an expert panel.

| | A | B |
|---|---|---|
| Percolate | 333 ml | 333 ml |
| Milk | 52 ml | 52 ml |
| Sucrose | 52 gm | X |
| L-Aspartyl-L-phenylalanine methyl ester | X | 0.088 gm |

At this concentration of L-aspartyl-L-phenylalanine methyl ester, the bitter taste of the Robusta was masked; sucrose at a similar sweetness level did not mask the bitterness.

EXAMPLE II

A percolate of 100 percent Paranas coffee was prepared in the following manner:

Fifty-four gms of ground Paranas coffee having a roasting color of 60 was combined with 1,200 ml spring water.

The coffee is heated at high temperatures until the percolation starts at which time the temperature is reduced so as not to permit boiling. When the water turns amber, usually in about ½–1 minute, percolation is carried out for 7 minutes. After 7 minutes, the heat is extinguished and the grounds allowed to drip within the basket for about 1 minute. The 1,200 ml of percolated Paranas coffee brew is divided into six samples of 200 ml each.

The following samples were prepared and organoleptic evaluations made:

A. Control - no additive
B. 5.0 mg L-aspartyl-L-phenylalanine methyl ester
C. 10.0 mg L-aspartyl-L-phenylalanine methyl ester
D. 15.0 mg L-aspartyl-L-phenylalanine methyl ester
E. 22.0 mg L-aspartyl-L-phenylalanine methyl ester
F. 30.0 mg L-aspartyl-L-phenylalanine methyl ester Organoleptic evaluations on hot black coffee:
A. very bitter, sour
B. slightly bitter, astringent, not sweet
C. slightly less bitter than B, not sweet
D. slightly less bitter than B, some sweetness
E. moderately less bitter than B, some sweetness
F. moderately less bitter than B, sweet Samples B and C contained levels of the dipeptide which were below the threshold level for sweetness (0.0025 and 0.005 percent respectively) and were found to demonstrate a marked repression of bitter taste.

What is claimed is:

1. A method of reducing the objectionable bitter flavor characteristics of low-grade coffees and products containing low-grade coffees consisting of adding to said coffees an amount of L-aspartyl-L-phenylalanine methyl ester sufficient to repress said objectionable bitter flavor characteristics in the resultant brew, without imparting a sweet character to said brew.

2. The method of claim 1 wherein L-aspartyl-L-phenylalanine methyl ester is added at a concentration of about 0.002 to about 0.016 percent on the basis of the coffee brew.

3. The method of claim 1 wherein the low-grade coffee is a roast and ground coffee and L-aspartyl-L-phenylalanine methyl ester is added to the roast and ground coffee during the quenching of the roasted beans, said L-aspartyl-L-phenylalanine methyl ester being incorporated in aqueous solution and sprayed onto the roasted beans subsequent to the beans having been cooled to temperatures below 400° F.

4. The method of claim 1 wherein the L-aspartyl-L-phenylalanine methyl ester is added to the dewaxed extract and co-dried therewith.

5. The method of claim 1 wherein the L-aspartyl-L-phenylalanine methyl ester is sprayed as a solution onto the coffee grounds.

6. The method of claim 5 wherein said solution of the L-aspartyl-L-phenylalanine methyl ester is aqueous.

7. The method of claim 1 wherein the L-aspartyl-L-phenylalanine methyl ester is incorporated in solution and sprayed onto the dried extract.

8. The method of claim 7 wherein the L-aspartyl-L-phenylalanine methyl ester is aqueous.

9. The method of claim 7 wherein the L-aspartyl-L-phenylalanine methyl ester is in the form of an emulsion with an aromatic coffee oil.

10. The method of repressing the objectionable flavor characteristics of bitter materials consisting of adding to said bitter materials L-aspartyl-L-phenylalanine methyl ester at a concentration of about 0.0025 to about 0.016 percent on the basis of the bitter material.

11. The method of claim 10 wherein the bitter material is a foodstuff.

* * * * *

UNITED STATES PATENT OFFICE
CERTIFICATE OF CORRECTION

Patent No. 3,829,588      Dated August 13, 1974

Inventor(s) Thomas P. Finucane and Joseph J. Halik

It is certified that error appears in the above-identified patent and that said Letters Patent are hereby corrected as shown below:

Column 4, line 55, after "about" and before "to" change "0.002" to read -- 0.0025 --.

Signed and Sealed this twenty-eight Day of October 1975

[SEAL]

Attest:

RUTH C. MASON
*Attesting Officer*

C. MARSHALL DANN
*Commissioner of Patents and Trademarks*